United States Patent [19]

Matteau et al.

[11] Patent Number: 4,622,508

[45] Date of Patent: Nov. 11, 1986

[54] LITHIUM BATTERY PROTECTION CIRCUIT

[75] Inventors: Michel Matteau, Gloucester; Howard R. Braun, Almonte; Christopher L. Gardner, Dunrobin, all of Canada

[73] Assignee: Her Majesty the Queen in right of Canada, as represented by the Minister of National Defence of Her Majesty's Canadian Government, Ottawa, Canada

[21] Appl. No.: 766,211

[22] Filed: Aug. 16, 1985

[30] Foreign Application Priority Data

Aug. 20, 1984 [CA] Canada ................................. 461385

[51] Int. Cl.$^4$ ............................................... H02J 7/00
[52] U.S. Cl. ........................................ 320/13; 320/17; 320/40; 320/48
[58] Field of Search ........................ 320/13, 14, 17, 18, 320/22-24, 39, 48, 40

[56] References Cited

U.S. PATENT DOCUMENTS

| | | | |
|---|---|---|---|
| 3,454,859 | 7/1969 | Ford et al. | 320/13 X |
| 3,707,664 | 12/1972 | Esch | 320/18 |
| 4,386,308 | 5/1983 | Emile, Jr. et al. | 320/22 |

*Primary Examiner*—R. J. Hickey
*Attorney, Agent, or Firm*—Sheldon Kanars; Jeremiah G. Murray; Edward Goldberg

[57] ABSTRACT

This invention provides a method and apparatus to prevent a battery or any one cell of a multi-celled battery from undergoing voltage reversals by disconnecting the battery from a load when the battery or one cell falls below predetermined reference potential levels. Means are provided for comparing the potential levels and disconnecting the load when the decreased potential levels are detected.

11 Claims, 2 Drawing Figures

LITHIUM BATTERY PROTECTION CIRCUIT

BACKGROUND OF THE INVENTION

1. Field of the Invention

This invention relates to battery protection circuits and more particularly to circuits for preventing any cell of a battery from being forced into reversal.

2. Description of the Prior Art

Some cells of a multi-celled battery can be driven into cell reversal during discharge. When forced into reversal, high energy density cells such as lithium/sulphur dioxide cells can and do vent violently with the possibility of the cell case rupturing explosively causing a fire hazard and the release of noxious gases such as sulphur dioxide and acetonitrite.

Some of the present lithium/sulphur dioxide batteries use silicon diodes connected around each cell to prevent the cells from reversing more than 0.8 Vdc. That is, if the cell voltage falls below zero volts, the diode will short circuit the cell at a voltage around-0.8 Vdc. However, it has been shown that this voltage clamp does not guarantee that any one cell will not vent violently when reversed.

It is possible that the change in chemical composition as the cell potential falls below zero volts may be sufficient to create an unstable cell.

SUMMARY OF THE INVENTION

It it therefore an object of this invention to provide a method and apparatus to prevent the battery or any one cell from undergoing voltage reversals.

According to one aspect, there is provided a method for protecting a battery having at least two cells, and being connected to a load, comprising the steps of:
 comparing the potential of said battery with a first reference potential;
 comparing the potential of at least one cell of said battery with a second reference potential;
 monitoring said compared potentials; and
 electrically disconnecting the load from the battery when either the battery potential falls below the first reference potential or when the potential of any one cell falls below the second reference potential, thus preventing further discharge and reversal of said cell.

According to another aspect of this invention, there is also provided an apparatus for protecting a battery having at least two cells, and being connected to a load, comprising:
 means for comparing the potential of said battery with a first reference potential;
 means for comparing the potential of at least one cell of said battery with a second reference potential;
 means for monitoring said compared potentials; and
 means for electrically disconnecting the load from the battery when either the battery potential falls below the first reference potential or the cell potential falls below the second reference potential, thus preventing further discharge of the battery and reversal of said cell.

Particular embodiments of the invention will be described in conjunction with the accompanying drawings.

DESCRIPTION OF THE PREFERRED EMBODIMENT

Figure 1:
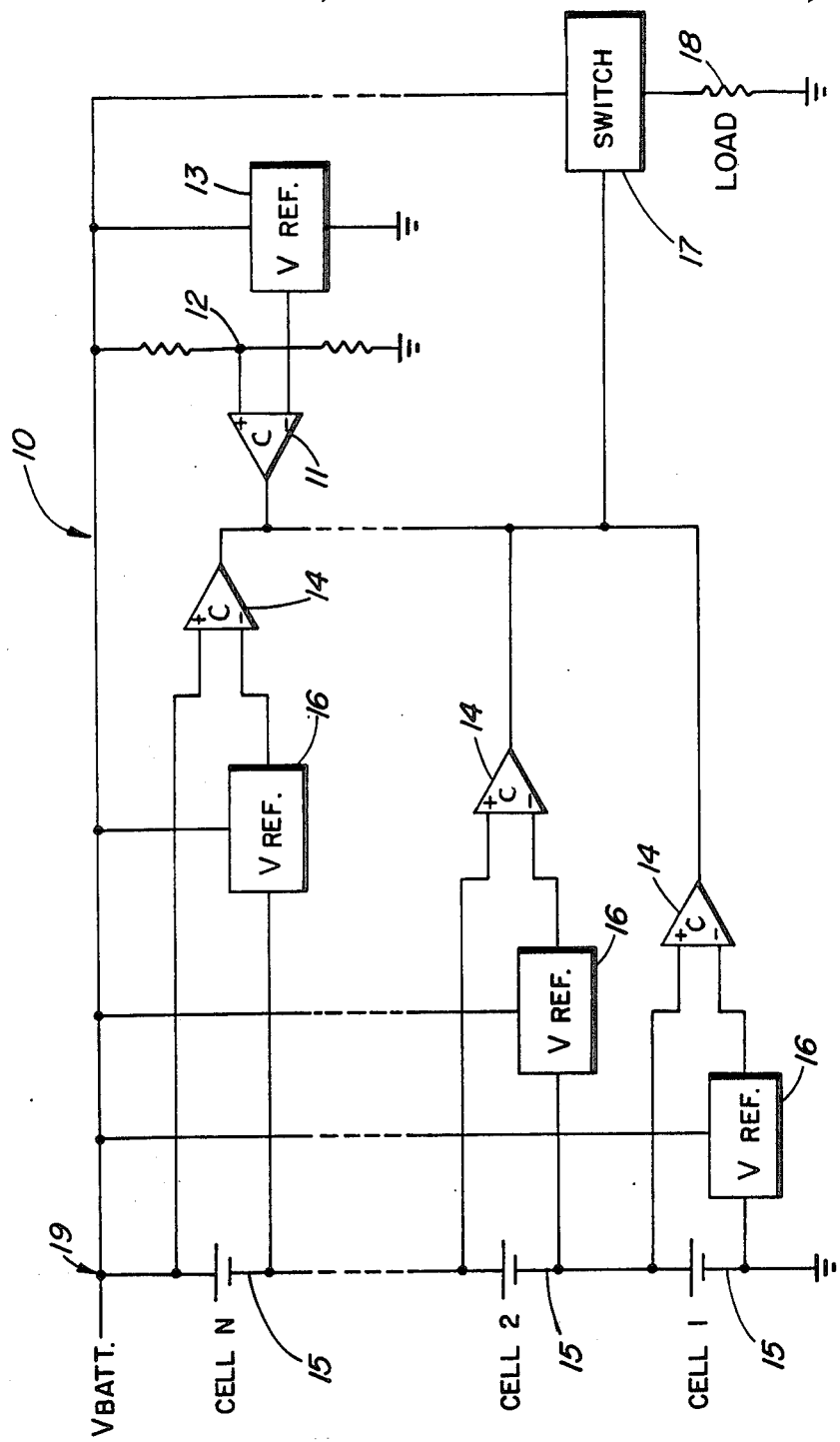
FIG. 1 is a block diagram of a protection circuit according to this invention.

Referring now to FIG. 1, reference numeral 10 indicates a block diagram of the circuit used in the present invention. The circuit is basically comprised of a first comparator 11 used to compare a portion of the battery potential at 12 with a first reference potential 13. A number of comparators 14 are also provided to compare the individual cell potentials 15 with second reference potentials 16.

The circuit also includes a switch 17 connected between the battery 19 and a load 18. The switch 17 is responsive to an output signal provided by any one of the cell potential comparators 14 or battery potential comparator 11. If one of the comparators 11 or 14 detects a decrease of potential below the specified voltage reference potential 13 or 16, then an output signal is transmitted from the comparator having detected such a decrease to switch 17 which will then electrically disconnect the load 18 from the battery 19.

Figure 2:
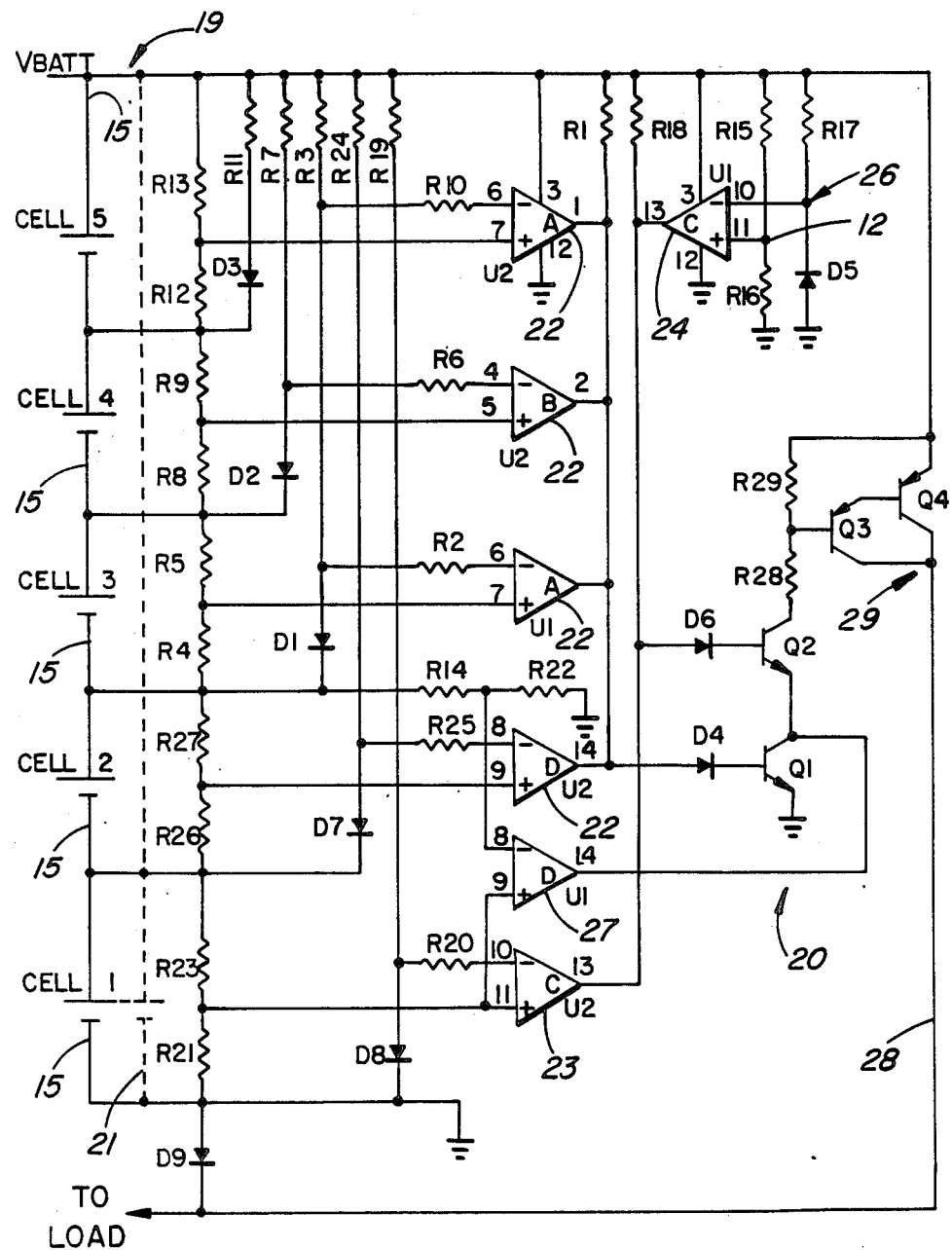
FIG. 2 is a schematic diagram of the protection circuit used in the present invention.

As is shown in FIGS. 1 and 2, the battery protection circuits 10 and 20 are connected in a manner that permits the monitoring of all cells 15 which form part of the battery 19. However, as shown at the dotted line on FIG. 2, the circuit can also monitor the battery condition when only one cell potential 21 along with the battery potential 12 is connected.

Referring to the schematic drawing of FIG. 2, it can be seen that the $Li/SO_2$ battery voltage monitor is a relatively simple circuit. The circuit is comprised of a number of comparators, transistors, diodes and resistors.

In this circuit, the outputs of comparators 22 are all connected to resistor R1 and transistor Q1 via diode D4. In normal operation, all cells 15 are charged to a potential greater than 1.50 volts, the outputs of comparators 22 are open and R1 provides base current to Q1 via D4.

Should any cell potential fall below the threshold voltage, one of the above outputs will go to ground potential causing Q1 to turn off. Diodes D4 and D6 are used to ensure that Q1 and Q2 turn off should the saturation voltage of the output transistor (not shown) in the comparators 22, 23, 24 and 27 exceed the Base-emitter voltage of the transistor.

Connected to Q2 via D6 are the outputs of comparators 23 and 24. Q1 and Q2 are connected in a "wire-AND" configuration. That is, both Q1 and Q2 must be on to enable the load driver Q3 and Q4. The outputs of comparators 23 and 24, connected to Q2, were separated from the other outputs of comparator 22 to allow the circuit to be used with two types of battery configurations.

A Type I battery configuration has all the cell voltages available for monitoring. As shown in FIG. 2, cells 15 and battery 19 are all connected to the circuit. The Type II battery configuration, as is shown by a dotted line in FIG. 2, has only the most negative cell, as well as the total battery voltage, available for monitoring.

To prevent false triggering, a detecting circuit formed by R14 R22 and comparator 27, is used to distinguish between the two battery types.

When the first type of battery is used, the output of comparator 27 is open.

If the detecting circuit detects the presence of the second type of battery, the output of comparator 27 turns on, shorting the collector of Q1 to ground. The circuit will then ignore any inputs to Q1 thus preventing false triggering.

The outputs to Q2 are always required. The output of comparator 24 is driven by the overall battery monitor circuit indicated at 26. This operates as a safety valve. If one or more of the cell monitors should fail, this circuit will turn off the load connected to lead 28 when the total battery voltage reaches a specified level or less. Comparator 23 is connected to Q2 and is also connected to the only cell 21 that is available for monitoring in both types of batteries.

Diodes (D1, D2, D3, D7, D8 and D5) connected to the inputs of comparators 22, 23 and 24 are all used as voltage references. The voltage at the diodes is held constant to approximately one-half of the cell shut-off voltage.

The output driver stage 29 for the load is a PNP darlington pair. A darlington pair configuration was chosen in this design to provide sufficient gain for driving the load.

Each cell of the battery is connected across a voltage divider whose output is compared to a diode reference connected to the most negative terminal of the cell. When the output of the cell voltage divider falls below the diode reference voltage, the comparator connected to both voltages switches causing the load connection 28 to be turned off preventing further discharge of the battery 19.

The overall battery monitor circuit 26 ensures the battery load will be disconnected if the total potential falls below a preset level. This circuit is used as a backup when used with a Type I battery should one of the cell monitors fail. When used with a Type II battery, this circuit is the only means of monitoring battery voltage.

The circuit consists of resistors R15, R16 and R17, zener diode D5 and comparator 24.

The zener diode D5 was selected to be approximately one-half of the battery cutoff voltage required to ensure reliable operation of the circuit. The comparator 24 will switch when the voltage at the junction of R15 and R16 falls below the zener voltage.

What is claimed is:

1. An apparatus for monitoring and protecting a battery having a plurality of cells, and being connected to a load, comprising:
   first means for comparing the battery potential with a first reference potential;
   second means for comparing the potential of each cell with a respective second reference potential and third means for comparing the potential of only one of said cells with said second reference potential;
   detecting circuit means for distinguishing between first and second battery types, said first battery type having all of said cells available for monitoring by said second means, said second battery type having the total battery potential and said one cell available for monitoring by said first and third means, wherein only said one cell is available for monitoring in both said first and second battery types;
   means for establishing said reference potentials; and
   means for electrically disconnecting the load from the battery when either the battery potential falls below the first reference potential or a cell potential falls below the second reference potential, thus preventing further discharge of the battery and reversal of said cell.

2. The apparatus as defined in claim 1, wherein all cells of said battery are connected to said means for comparing potential with said second reference potential.

3. The apparatus as defined in claim 1, wherein said means for establishing said reference potentials includes respective voltage dividers establishing portions of said battery potential and cell potential as said reference potentials.

4. The apparatus as defined in claim 3, wherein said comparing means includes voltage comparators.

5. The apparatus as defined in claim 4, wherein said disconnecting means includes a transistor switch connected to said voltage comparators.

6. The apparatus as defined in claim 4, wherein said means for establishing said reference potentials includes a plurality of diodes connected to respective voltage dividers and voltage comparators.

7. The apparatus as defined in claim 6, wherein one of said diodes is a zener diode.

8. The apparatus as defined in claim 3, wherein said means for comparing potential of a cell includes a plurality of voltage comparators and voltage dividers connected respectively to each cell.

9. The apparatus as defined in claim 6, including a driver stage connected between said transistor switch and said load.

10. The apparatus as defined in claim 1, wherein said battery consists of a lithium/sulphur dioxide battery having at least two cells.

11. The apparatus as defined in claim 1 wherein said detecting circuit means for distinguishing between said first and second battery types includes a voltage divider and comparator, the output of said comparator being open when used with said first battery type and turning on when used with said second battery type.

* * * * *